Figure 1:
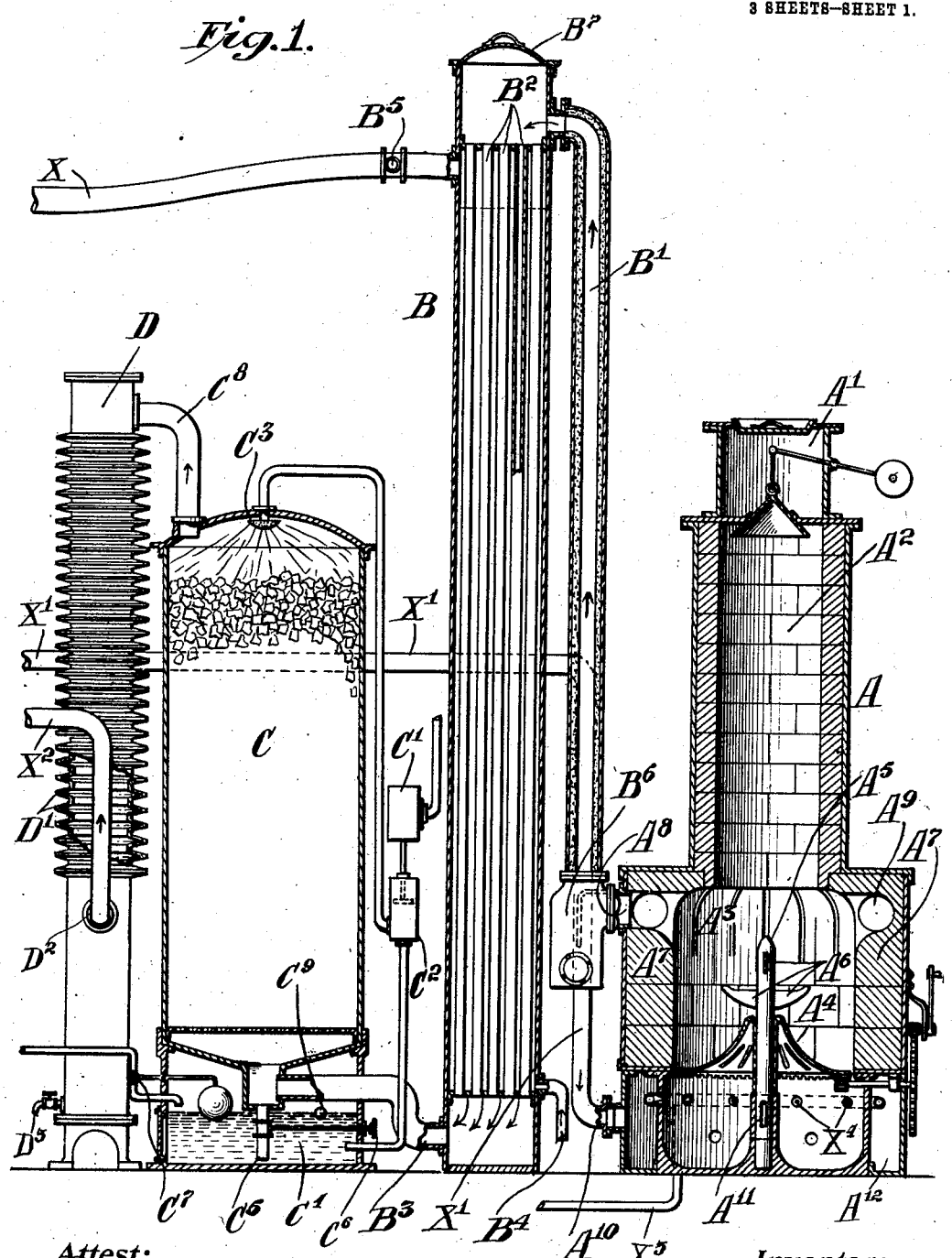

J. M. W. KITCHEN.
POWER GENERATING SYSTEM.
APPLICATION FILED SEPT. 16, 1908.

992,780.

Patented May 23, 1911.

3 SHEETS—SHEET 3.

UNITED STATES PATENT OFFICE.

JOSEPH MOSES WARD KITCHEN, OF EAST ORANGE, NEW JERSEY.

POWER-GENERATING SYSTEM.

992,780.     Specification of Letters Patent.     Patented May 23, 1911.

Application filed September 16, 1908. Serial No. 453,275.

*To all whom it may concern:*

Be it known that I, JOSEPH MOSES WARD KITCHEN, a citizen of the United States, residing in the city of East Orange, State of New Jersey, have invented new and valuable Improvements in Power-Generating Systems, of which the following is a specification.

The object of my invention is to reduce the cost of, and to secure mechanical and utilitarian advantages in the production of motive power through the exercise of various co-active influences, and through the exercise of economies in connection with saving heat directly, in using heat regeneratively, and in providing means for using low cost fuel. In particular I overcome defects in and limitations to the use of either steam power or gas power when used singly.

In particular I have as an inventive object, the control of gas power by an outside power such as steam, generated, accumulated and applied to initiate and control the rate and character of, and reversal of motion in a gas engine acting as a prime mover. While utilizing the heat wastes of the gas engine in generating power accessory to the gas engine, I do not confine my use of that power as a mere sequence and auxiliary to the force of the gas engine.

The invention is available in connection with power plants of moderate size and simple in form, but is more valuable when applied in larger plants.

The main basis on which this invention is founded is the generation of low cost so-called producer gas, which I define as fuel gas generated in an internally fired gas generator. This gas is in contradistinction to illuminating gas, which is produced by the exterior firing of gas distilling retorts. When the internal combustion engine was first used, high cost gas rich in thermic units was used as fuel for these engines, and methods were proposed for utilizing the heat of the jacket water and of the exhaust gases to generate steam for motive use. Those efforts were of no practical use because in that day gas was too expensive to be used extensively in the generation of power, and it was not then, or now, worth while saving small amounts of gas engine heat wastes, and also because the methods used to economize this waste heat were crude and ineffective. With the advent of a large use of the cheaper and poorer quality producer gas, which can be highly compressed in the internal combustion engine, and which burns more quickly and with comparatively little heat waste as compared with illuminating gas, opportunity has ben presented to secure advanced economic results through the use of composite gas and steam power generation. I believe that I am the first to work out a practical solution of the involved problems in connection with composite use of steam and producer gas for power generation, and am hence entitled to claim the use of producer gas in composite gas and steam generating plants, as an invention and the starting point of a new advance in power generation economics. The successful solution of the problems involved has necessitated the use of various new combinations and novel structures by me, that previously had not been used. These combinations and structures are claimed more or less in this, and in each one of the co-pending applications hereinafter named.

Previously it has been assumed that steam under pressure for motive power could be generated in a practical manner from the exhaust jacket water and exhaust gases of the gas engine. As a matter of fact with the use of previously devised structures, the heat in the exhaust jacket water and exhaust gases is in so diluted a form as to be practically only available for heating water up to a temperature from which motive power of any intensity can only be secured from the indirect power created by condensing the small amount of water vapor generated. Even the heat of the exhaust gases applied in the most efficient manner is not sufficient for converting into steam under pressure the large volume of cooling water that must be passed through the gas engine jacket. Only a small part of the heated jacket water can be utilized for its higher heating by the exhaust gases in the production of steam, and the amount of steam thus produced if used continuously would hardly be more than enough to overcome the friction of the steam engine worked in unison with the gas engine. In fact, there would be practically no motive energy developed that could be applied in useful work. The jacket water can be easily utilized for heating purposes in a hot water heating system; but for power generation, and for the most part I have found that its heat can best be utilized in heating air for combustion to be used in the complete combustion of a solid fuel for the auxiliary heating of water partly heated by the wastes of the gas engine. However, the waste heat of the gas engine can be utilized to generate a certain amount of motive power for coöperative use with steam otherwise generated. Furthermore, exhaust gases from the gas engine cylinder, if freely expanded in an economizer immediately undergo a large diminution of sensible temperature, so much so as to prevent all possibility of utilizing the diffused heat in highly heating water in the production of steam under pressure. To economize such heat the compressed waste gases of the engine cylinder must be kept under compression until the high sensible heat has been transferred to the heat absorbing medium. I practice this plan in my methods of economizing heat.

Producer gas power has its defects and limitations in use. The generation of producer gas is a process that is uncertain as to results, both as to the quality of the gas produced, and as to its quantity, if generated by inexpert operators. It takes a long time after a standby of the gas generating process to secure a production of gas that is at all burnable; and it takes a still longer time to produce gas of a desirably good quality. Hence, there is need of having an auxiliary source of easily and quickly generated tractable power, such as steam power, to initiate motion in the gas engine, and to maintain an equable production of gas and to secure a desired rate of motion in and an equable smooth drive for the mechanism actuated.

In securing the aimed for results of the invention, among other principles I apply the following: 1. Generating producer gas from low cost bituminous or other coal. 2. Freeing the gas from other condensable tarry products. 3. Utilizing any sensible heat of the newly formed gas to create steam under pressure or to heat feed water for useful work, and utilizing the steam if desired for making gas, or heating air after the expansion of the steam in accomplishing motive work. 4. Conserving low degrees of heat in the gases passing through the scrubber, by a circuitous use of the scrubbing fluid, incidentally, saving in the amount of water used, and also in securing a scrubbing fluid of some commercial value for its contained ammonia. 5. Freeing the gas from moisture and undesired amounts of tar by condensing the moisture and tar by contact with heat absorbing surfaces. 6. Conserving the heat of the exhaust gases of the internal combustion engine in creating steam. 7. Supplying feed water to the water-jacket of the internal combustion engine, at a temperature best suited to secure efficiency of action in the internal combustion engine, utilizing the waste heat of the process used in securing feed water of the right temperature, or in other cases heating air for combustion with the low degrees of the waste heat. 8. Uniting the dual forces of the internal combustion engine and of a steam motor actuated by the steam generated in part at least from the heat wastes of the internal combustion engine, in one outflow of motive force; the unification of energy being done in a manner that will substantially control the motive activity of the internal combustion engine and prevent loss of motive energy in either source of power due to unfavorable rates of rotation of the shafts of the internal combustion engine and of the steam motor. 9. Conserving the heat of the exhaust steam used in the motor, or of low degrees of heat of exhaust gases to heat air for combustion, primarily heating the air with the heat in water of condensation, and utilizing the heated air for purposes of combustion in the system. 10. Unifying the energy of the internal combustion engine and that of a low pressure turbine actuated by steam generated at relatively low pressure, but acquiring power indirectly through a vacuum exhaust, that exhaust being created by surface condensation and by the mechanical suction of the engine, the heat of some of the exhaust steam being conserved in the generation of gas when desired. 11. Securing the advantages of using in cycle jacket feed water that is practically free from earthy salts or other incrustating contaminants.

In order that the scope of the invention may be fully understood, it should be considered in connection with other inventive ideas, which are generally used by me coactively with the present invention in composite power and heating systems, my claims for which have already been allowed, or which are pending, or which will be applied for in further applications. These connected ideas will be referred to later in this specification.

Figure 2:
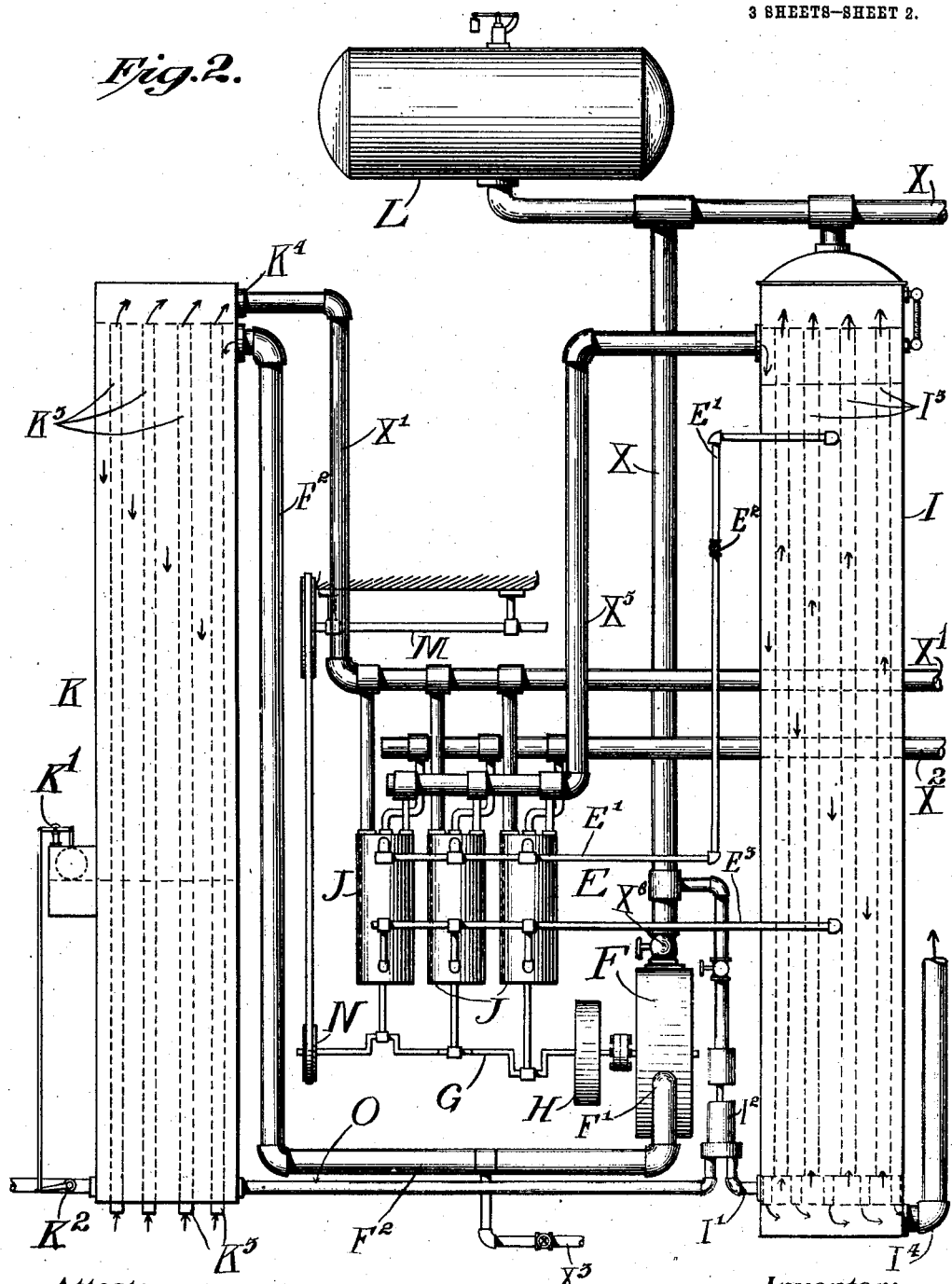
Figure 3:
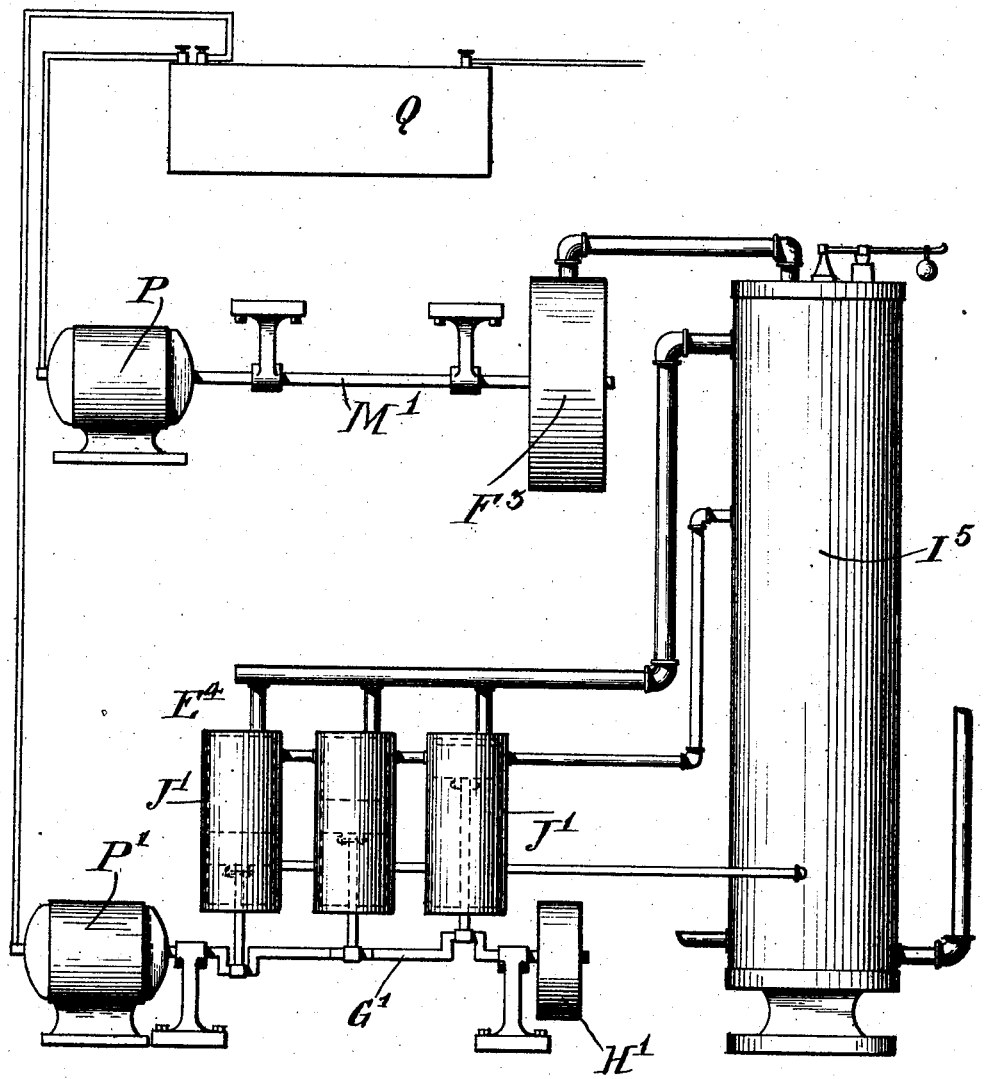

In the accompanying drawings: Figures 1 and 2 diagrammatically represent a system for power generation comprising my invention, the parts in Fig. 1 being placed to the right of those in Fig. 2 for purposes of study. Fig. 3 diagrammatically represents a power generating system differing in structure from that shown in Figs. 1 and 2, but which comprises an applied principle of my invention.

It should be understood that the drawings only crudely illustrate in a diagrammatic way some applied principles which I use under various circumstances in composite steam and gas power generation. I want it particularly understood that it is only by using both sources of motive power that the greatest controlling operative possibilities and the greatest economy in fuel are secured in connection with the use of gas power. The limitations of gas power can only be made good through the co-action of the more moderate and tractable power of steam, and it is only through the co-use of steam generation that the undependable nature of producer gas power can be made available and all of the heat wastes of gas power can be utilized. In power plants of any important size, it is desirable to have an accessory, easily handled and tractable means, such as a steam boiler using natural draft and a steam motor to use in initiating motion in the producer gas engine, and to do motor work in connection with gas generating and also to have the steam for heating purposes. In all such cases the gas engine, and the means of transferring and economizing the heat wastes of the gas engine, are intimately in connection with the auxiliary motor in such a way that the wastes of the gas engine heat water to a moderate superheat.

*The gas producer.*—In Fig. 1 the gas producer A is specially designed to burn bituminous soft coal. It is comprised of a charging box $A^1$, a fuel feeding magazine $A^2$, and a low height combustion chamber and ash pit $A^3$. The combustion chamber is wider than the fuel feeding magazine $A^2$ so that the fuel in spreading out after passing from the fuel magazine will leave a gas space between the fuel mass and the upper periphery of the combustion chamber. There is an annular air distributing space $A^{12}$ around the lower part of the producer, having the air inlets $X^4$. The grate $A^4$ revolving upon the movable pin $A^5$ is arranged for a comparatively free entrance of air at the center of the grate, but for only a small amount of air at the periphery of the grate. The grate provides for the centrifugal horizontal travel of the fuel and the gases.

$A^6$ are arms which stir up the fuel and prevent its clogging, the same being actuated by a lever introduced into the slot $A^{11}$. These arms are protected from high heat by the mass of unburned fuel around them.

The burning gases are conveyed centrifugally underneath the fuel mass and rise vertically through the fuel mass at its periphery where the fuel has become more or less coked, and pass out through the gas passage $A^9$, which is formed in the upper part of the fire-bricks $A^7$, slotted passages connecting the interior of the combustion chamber and the passage $A^9$. The bricks $A^7$ become highly heated and by contact transform into a fixed gas a considerable part of the volatilized condensable tarry vapors before the gases find exit through the apertures, $A^8$.

The special form of producer here shown is intended to be used in situations where there is little head room in which to use the poke rod which is used in manipulating the fuel mass.

*The gas cooler and water heater.*—The gas, after passing through the exit $A^8$, is run through the dust intercepter $B^6$ and is drawn upwardly through the conduit $B^1$, which has a non-conducting lining, and then downwardly through the gas cooler and water heater B. Cold and even refrigerated feed water is introduced in the bottom of the gas cooler through the inlet pipe $B^4$, and travels upwardly to take the place of the water heated or turned into steam through the influence of the heat of the gases traveling downwardly through the gas tubes $B^2$, and finally finds exit through the outlet $B^3$. The feed water may be altogether or in part the water cooled in the condenser and air heater K, or water newly introduced into the system. A certain new supply must be introduced to make good the water changed into steam and gas in the producer A, and which is finally exhausted through the engine E and exhaust pipe $I^4$, or which may be forced out of the gas cooler after absorbing the sensible heat of the newly generated gases passing through the cooler. The cover $B^7$ may be removed for cleaning purposes. Any steam, if generated, is held back in the device B by means of the valve $B^5$ to such extent as to secure the needed pressure for effective work as it emerges into the steam pipe X. The cooled gas passes through the outlet $B^3$ into the under part of the scrubber C. If much tar is condensed in the cooler special provision should be made to draw it off before the gases enter the scrubber, to prevent its clogging the scrubber.

*Preventing loss of heat from radiation.*— In getting the best economic results in utilizing waste heat of low degrees of temperature, particular attention has to be given to keeping the intensity of the sensible heat to be economized at as high a temperature as is possible until the transmission of the heat to the heat absorbing medium is completed. Heat is transmitted very quickly through good heat transmitting mediums. This economizing provision is especially necessary in connection with the conveyance of very hot exhaust gases from the point of generation, as in the case of the exhaust cylinder gases of the internal combustion engine, to the point of utilization of the heat. For this reason it is desirable to have the heat absorbing device as close to the point of heat generation as is possible, and that the conduit conveying the hot gases be very large so as to avoid friction, and also be nonconductive of heat. In order to overcome the loss of sensible heat due to expansion of the waste gases, either due to an induced draft, or to the escape of the gases from a state of compression in which the high heat is generated, I provide an outlet of suitable size for the heat transferring device to prevent expansion of the gases until after the heat has been transmitted. Preferably I line the gas conduits conveying the highly heated gas with a non-conducting lining held in place by a surrounding metallic incasement. This arrangement shown in the conduit B' prevents radiation of the heat, yet also preserves the integrity of the metallic incasement by radiating heat from it in sufficient quantities to prevent it from becoming dangerously overheated. I also cover with non-conducting incasements such parts of the heat economizers that I use, from which it may be desirable to prevent the radiation of heat from. In the device B, I provide for very great vertical length but relatively small diameter, so that the gases coming through the large diametered and non-conducting gas conduit leading from the gas generator in passing through the gas conduits of the gas cooler loses its heat rapidly in the higher levels of the device, and before much expansion of the gases occurs. The higher part of this device would be covered with non-conducting material to conserve in water heating the high degrees of heat, while the lower part would be left unprotected to allow for the freest radiation of the lowest degrees of heat passing downwardly in the device. Inasmuch as the feed water forced upwardly through this device would be as cold as possible, the gases would not only be cooled, but also tarry vapor would be condensed on the water cooled surfaces. The gases passing out through a somewhat contracted aperture at the bottom of the device under the inductive action of the engine, would immediately expand and show a low sensible temperature, which is desirable to have in connection with the high compression of gases that is favorable to good internal combustion engine work using producer gas. Under conditions where there is a large amount of tarry vapor present in the gas produced, this device would be of larger diameter, allowing for the immediate expansion of the gases near the upper inlet of the device, with only a moderate heating of the water, securing a more complete condensation of the tarry vapors on the lower levels of the water tubes. In this case the moderately warm water would be conveyed out of the device and forced into the bottom of the water heater I in connection with the water of condensation from the condenser K.

Under certain conditions, I have a special device for use in plants of this character in which I equalize by admixture the temperatures of the water that has passed through the device B and of the hot water of the engine's water jacket, and then cool the commingled waters to a temperature most efficient for water jacket feeding. This process is substantially the same in effect as is produced by the arrangement of the heater I and by the water circulation in that device. It is obvious that this principle of heat conservation may be applied under various conditions in different ways. The efficiency of the internal combustion engine is promoted by a proper temperature of the water fed into the water jacket; and it is more economical to cool the hot water for this purpose than to heat cold water, especially if the heat of cooling is transferred to air for combustion, and we also in this case gain the advantages of a feed water free from earthy salts.

*The scrubber.*—The scrubber C is of ordinary construction, except that provision is made for using the scrubbing water in a continuous round, and in copious amounts, to free the gas from sulfur vapors, dust and uncondensed tarry vapors. The circuitous flow of cleaning fluid is produced by the pump $C^2$, actuated by the steam cylinder $C^1$. The water, after passing through the spraying device $C^3$ emerges through the pipe $C^5$, controlled by the valve $C^6$ to the receptacle $C^4$. After the scrubbing fluid is sufficiently impregnated with ammonia a small stream of the scrubbing fluid is allowed to run out through the orifice $C^9$, in the water receptacle $C^4$, and a replenishing supply of fresh water is introduced through the ball controlled valve $C^7$. A scrubbing fluid highly impreganted with ammonia products has a salable value for ammoniacal fertilizer production.

*The gas drier.*—The washed gas finds access through the pipe $C^8$ into the gas drier D. This device has sufficient size to contain a moderate store of gas for use in the engine. Its walls are extended by corrugations $D^1$; and any excessive moisture in the gas is more or less precipitated by condensation around the walls. A space is left at the lower part of this device to hold water of condensation and also any tar that may be condensed or precipitated. A cock $D^3$ drains off the contents. A contact tar intercepter may be inserted in the drier. The device has a stop valve indicated by $D^2$ which prevents the back flow of the gas into the previously named parts under the impulse of the engine E.

*The internal combustion engine.*—The gas is conducted through the pipe $X^2$ to the engine E. This engine represents any one of the ordinary types of multiple cylinder engines, having water jackets J, the crank shaft G, the fly wheel H, and the pulley N;

which pulley is belted to the pulley of the shaft M. The exhaust gases find exit through the pipe $X^5$ to the top of the economizer heater I.

The multiple vertical cylindered engine for use with producer gas is efficient for certain kinds of work and applications, such as in the naval marine, where light engine weight and economy of room occupied by the engine are essential requirements.

*The steam turbine.*—The reciprocating single or multiple cylindered steam engine may be used in a power generating system comprising my invention; but where practical, a low pressure steam turbine may be advantageously used alone or in connection with a reciprocating engine.

F indicates a turbine operated by low pressure steam generated in the gas cooler B and the economizer boiler I. The shaft of this turbine F is united with the shaft G, and the turbine works in unison with the engine E, assisting in securing the gaining of a more uniform, smooth motion for the machinery driven by the combined motors as well as in unifying the kinetic energy generated by the gas and steam motors. This illustration merely indicates the principle involved in my invention of a composite use of the two forces. An internal combustion engine of the type shown is not the best to use in a composite power stationary generating system of this nature; but many such engines are already made and in use; and considerable economy in generating power and increased smoothness of motion can be secured in a system by incorporating with such engines the other elements here described and illustrated. The turbine F is of a type suitable for the use of steam of low pressure and large volume, rather than one whose efficiency is due to very high velocity in the steam and having a rapid rate of revolution. In Fig. 3 the turbine $F^3$ would be of a type to secure a greater efficiency from the steam pressure generated in the boiler $I^5$ through a more rapid rate of revolution, its shaft $M^1$ and the shaft $G^1$ being run at different rates of speed.

The type of steam turbine used may be varied. It may be a simple inexpensive construction of the impulse and re-action type and of comparatively low efficiency, such as is indicated by F in Fig. 2, which is arranged for low pressure work, using large volumes of steam, and securing most of its motive force indirectly from the vacuum exhaust created in the device K through surface air condensing. A turbine that may be used in my invention to advantage would be of a more or less compounded type, with high mechanical efficiency. This would be the case in an arrangement of elements like that shown in Fig. 3, where a better opportunity is offered to use a turbine of more bulky size. In this case a higher heating would be given to the water that bears the heat wastes of the internal combustion engine.

It will be observed that the power stored in the tank L, which receives its steam through the conduit $X^7$, and delivers it to the turbine through the conduit $X^6$, can be used intermittently to start the engine E or to control its rate of speed, and by a suitable modification of structure, this outside reserve of power can be used to reverse the engine E.

*The economizer heater.*—The economizer heater I is especially designed to utilize to the greatest possible extent the heat of the exhaust gases from the engine, and some of the heated jacket water from the engine, for forming steam under moderate pressure. I also utilize this heater for securing a feed water for the internal combustion engine jackets of a desirable temperature. The boiler here shown illustrates diagrammatically only the highly efficient principle involved of heating water progressively through the vertical counter-current travel of water and heating gases. The hot gases coming from the engine E through the pipe $X^5$ are forced downwardly by the engine's scavenging stroke in a plunging travel over the tubes $I^3$, and are exhausted through the exhaust pipe $I^4$ which is of sufficiently small caliber to prevent the gases expanding in the heater. Cool feed water is introduced at the bottom of the boiler through the pipe $I^1$ actuated by the pump $I^2$, which draws water from the device K through the pipe O. A gravity circulation of water from the engine jackets J and through the heater I is maintained through the pipes $E^3$ and $E^1$, the rapidity of the circulation being controlled by the valve $E^2$. The feed water for the engine cylinder jackets is taken from the boiler at a level where the temperature of the water is of a desired degree and is conveyed from the cylinder into the boiler at a relatively high level.

To secure a circulation of the jacket feed water through the water jacket and economizer heater the force of gravity alone will in certain conditions not alone be sufficient. In such cases the circulation would be promoted by a means of mechanical acceleration. In either case the object is to secure a feed water of a suitably low temperature for the jacket feed water and yet make use of the heat absorbed in the jacket of the gas engine. This utilization of the heat in the jacket water may be effected either by more highly heating the water after its passage through the water jacket, and turning some of the heated water into steam as is indicated in the drawing; or else, by cooling part or all the feed water and transferring the heat of cooling to air for combustion, this alternative being shown and described in my co-pending application Serial No. 465,966, filed Dec. 4, 1908. It is possible to utilize all of the exhaust gas heat in generating steam under low pressure. It must be understood that in the present invention I do not confine myself to the specific structures here illustrated. Various conditions require modifications to suit conditions in hand.

The temperature of the hot exhaust gases entering the economizer boiler I being much higher than the temperature of the feed water, raises a part of the jacket water to a temperature that produces steam under low pressure.

It should be understood that in constructing economizing heater devices for carrying out the involved principles of the invention the arrangement of heating surfaces, water spaces and gas spaces would vary according to the nature of the fuel used and of the temperature of the gases available. If a fuel is used high in sulfur content, a boiler of more expensive construction is necessary than where gases of relatively moderate temperatures and more free from sulfur vapor are passed through the boiler. In some cases the gases must only be brought in contact with submerged heating surfaces to prevent destructive injury to the metallic surfaces. In other cases the gases can be brought in contact with heating surfaces in such a manner that the boiler can act for super-heating steam as well as for generating steam. In using a certain quality of coal, such as anthracite, and in which the heating of the newly formed gas is not essential because of small presence of tarry vapors, the gases pass into the gas cooler at relatively low temperatures, and in this case the cooling surfaces soon become coated with a thin film of tar which sufficiently protects the heating surfaces from damage from sulfur vapors.

*Superheating the steam.*—The advantages of super-heating steam for motive use are generally well known; but trouble due to condensation of steam when mechanically compressed, or when compressed by boiler pressure while at a distance from the boiler, and then prevented from absorbing heat by convection, is not so generally recognized. In the power generating systems devised by me, I provide for superheating the steam, and in some instances provide a separate super-heater. In Fig. 2 I illustrate how the steam in the economizer boiler I may be super-heated by having the water level of the boiler sufficiently low to allow the formed steam to pass in the tubes $I^3$ through a zone of hot exhaust gases from the engine E, which are introduced at a high level in the heater. This arrangement is satisfactory if the heating gases from the engine are sufficiently intense in temperature, and are free from objectionable contaminations.

*Storing an accumulated steam power.*— In producer gas power plants it is desirable and frequently necessary to have some auxiliary source of power for initiating and maintaining the generation of a supply of gas for the gas engine, and for initiating motion in the engine. Sometimes a hand blower is used to force air through the producer. Sometimes a gasolene engine supplants the hand blower. In large plants it has been found advantageous to secure an induced draft through the producer by means of an exhausting and blowing fan, and also to use the same device for forcing the gas to the engine. It is usual to initiate motion in the engine through the use of a stored supply of highly compressed air. The present invention provides for the accumulation of a stored supply of steam in large volumes, which is generated in part at least, from a source of heat outside of the steam generated by the heat wastes of the gas engine; and then using the accumulated steam to start the gas engine as well as to maintain a desired rate of speed in the engine; in other words, employing the steam power to control the gas power. It will be obvious that to initiate motion in the gas engine, steam or other outside power must be initially generated from heat other than that generated by the burning of gas in the engine. In Patent No. 883,809, issued to me April 7, 1908, I show an accessory boiler for generating steam for initiating the operation of the system described. The present invention is an evolutionary advance on that idea. In the several co-pending applications hereafter refererd to I describe and claim further developed inventive ideas in connection with the storage and use of economized heat energy and of heat energy directly produced from the burning of coal. But such ideas are not herein claimed.

The advantage of having a sufficiently efficient control over the gas engine by an outside power such as a large volume of stored steam, is illustrated in connection with the problem of applying gas power to marine propulsion in large vessels. Up to the present time no suitable engines have been made for using producer gas in large vessels, nor has any means been publicly proposed for easily starting, quickly reversing and controlling in a general way the activity of large gas engines for marine usage. In the present invention I describe and claim such means. The principles outlined diagrammatically in the drawings can with requisite modification of structure be applied in large naval and mercantile vessels. In such cases a vertical multiple cylinder gas engine can be applied in connection with a multiple cylinder high pressure steam engine to a propeller shaft, while the exhaust steam from the high pressure steam engine can be utilized in a low pressure turbine, run condensing.

The steam generated in the heater I unites with any steam that may be generated in the heater B, and is stored under more or less pressure in an accumulating tank L from which it passes through the pipe X into the motor F controlled by the valve $X^3$.

*The water cooler and air heater.*—After passing through the motor F the steam finds its way through the exit $F^1$, through the exhausting conduit $F^2$ into the top of the air heater and water cooler barometric condenser K. Such part of the steam as may be needed for gas production is drawn by the action of the engine E from the pipe $F^2$ through the pipe $X^5$ under the grate of the gas producer A. The balance of the steam surrounds the air tubes $K^3$ and gradually descends as it cools, forming a certain depth of water of condensation in the lower part of the device, the depth of the water in the air heater being controlled by the device $K^1$, which operates the valve $K^2$. In practice this device K is located at a much higher level than is indicated in the drawing, and the water condensed is drawn downwardly in pipes to its place of use, thus securing by the weight of the water a barometric vacuum in the condenser of some economic value. Cool air entering at the bottom of the tubes $K^3$ is progressively heated in its ascent and finds emission through the outlet $K^4$ into the conduit $X^1$, through which it is drawn and may be conveyed into the cylinders of the engine E and through the inlet $X^4$ underneath the grate of the producer A, or used otherwise. The cooled water is pumped by the pump $I^2$ through the feed water inlet $I^1$ of the boiler I. The heated air is used for purposes of combustion.

*Unification of the forces of explosion and steam expansion.*—The idea is old of utilizing the waste heat of the internal combustion engine to create steam power; but the methods previously proposed for doing so have been among others economically unsatisfactory. There have been two reasons for this: (1) inefficiency in the means for economizing the very diffused heat wastes of the internal combustion engine, and (2) poor methods for joining the two motive forces generated by explosion and steam expansion. In my invention, and in this connection, I secure not only advanced results in fuel economy, but I also secure a union of the two forces without loss of efficiency in either force, and a more smooth and uniform outflow of motive energy, and one more tractable. In one or another way in a composite power generating system I utilize practically all of the heat for generating motive power that passes out from the internal combustion engine in the jacket water and in the exhaust gases. In co-pending applications I show several methods of effecting this conservation of heat. In the present application I show a simple method of securing steam of low working pressure from a part of the jacket water and from all of the exhaust gases of the internal combustion engine.

My methods of joining the force of explosion and of the expansive force of steam generated from the heat wastes of the internal combustion engine vary under different conditions, and vary from the methods hitherto used. In U. S. Patent #883,809 issued to me Apr. 7, '08, I illustrate a method of unifying the two forces through the mechanical compression of steam by the force of explosion, utilizing the mechanically compressed steam for actuating the prime mover. In application for patent, Serial No. 465,966, filed Dec. 4, '08, I illustrate a method for unifying the two forces through differential pulleys and belting, and also illustrate two other methods of unifying the two forces. In the present application I show other means for accomplishing the same result. In the method illustrated in Fig. 2, I connect the shafts of a steam turbine and of an internal combustion engine. This method may be convenient; but usually it is not the most economically desirable. When the result desired is only the generation of the electric current, I utilize the method shown in Fig. 3, in which the internal combustion engine individually rotates a dynamo, and in which the steam turbine also individually rotates another dynamo. The two forces of power may be united in a storage battery from which the stored energy is drawn in one outflow of force.

In Fig. 3, $J^1$ represents the water jacket of the engine $E^4$, and $I^5$ the economizer boiler used to generate steam from heated jacket water by the added heat from the exhaust gases of the engine. The steam is conveyed into the turbine $F^3$, and the turbine shaft $M^1$ rotates the generator P, while the crank shaft $G^1$, having the fly wheel $H^1$, rotates its generator $P^1$. Q represents the storage battery into which the two currents generated may be conveyed and united, and from which electric energy is drawn as needed.

It is obvious that the power of a shaft driven by the combined force of one or more cylinders of an internal combustion engine and the more tractable force of steam may be applied to useful work in a number of ways, such for example as in the shaft, pulley and belt drive common in every day industrial art; or in the driving of marine vessels; or of locomotives; or of hoisting machines. In all of these applications the modifying influence of steam renders the intermittent, intense jarring force of gas explosion more tractable and available.

An important advantage of practicing a unified motive force generated by both internal combustion engine and steam power is, that when the two sources of generated power are properly united and connected, there is a greater smoothness of motion than when the internal combustion engine alone is used. The steam both in the boiler and in the steam cylinder acts in a measure as an elastic cushion and equalizer of motion, continuing the push of the mechanism driven during the whole of the time when the rapidity of motion in the internal combustion engine is decreasing. This is particularly the case when a multiple cylinder reciprocating steam engine or a turbine is used. Such composite power generation enables the power user to utilize the more simple efficient and noiseless one cylinder internal combustion engine. Manufacturers have sought to overcome the inequality of the rates of revolution in the internal combustion engine's shaft by multiplying the number of cylinders attached to one shaft. This provision improves the smoothness of motion, but only at the cost of a lesser economic efficiency in the use of fuel. So far as my knowledge goes, a greater efficiency in fuel is secured when every internal combustion cylinder is free to work expansively of itself alone. This proposition becomes very clear when the yoking up of two separate internal combustion engines is tried. There is a very apparent loss of efficient action under such circumstances.

In the following claims, when I use the term "vertical counter-current water heater or boiler", I desire that term to be defined as meaning a device in which the highest degree of heat in the heating gases is first applied at the highest level of the device to the hottest water in the device; the gases being passed in a plunging travel downwardly in counter-current to an upward flow of feedwater, which is thus progressively heated; the coolest water absorbing the low temperature heat from the gases.

Subject matter is herein disclosed, which is not herein claimed, but which is more or less claimed in each of the following co-pending applications: Serial No. 415983 filed Feb. 14, 1908. Serial No. 460267 filed Oct. 30, 1908. Serial No. 465966 filed Dec. 4, 1908. Serial No. 482127 filed March 8, 1909. Serial No. 487694 filed Apr. 3, 1909. Serial No. 504132 filed June 24, 1909. Serial No. 504778 filed June 28, 1909.

What I claim as new is:

1. In a power generating system, the combination of (1) a producer gas generator, (2) an internal combustion engine for using the gas, (3) means for generating steam under pressure from the heat wastes of the internal combustion engine, (4) further means for generating steam, (5) means for combining, accumulating and storing the steam generated, and (6) means for using the combined and accumulated steam for controlling motion in the internal combustion engine.

2. In a power generating system, the combination of (1) a water jacketed internal combustion engine and a hot gas exhaust conduit for said engine, and (2) an economizer water heater connected with said water jacket but apart from said water jacket for economizing the waste heat of the exhaust gases of said engine, said economizer water heater comprising provision for a vertical counter-current travel of the water to be heated and of hot exhaust gases from said engine, said water traveling upwardly and the gases traveling downwardly, said economizer comprising means for the introduction into said water heater of preheated water from the water jacket of said engine at a level in said water heater where the temperature of the water is substantially the same as that of the pre-heated water introduced from said water jacket but where the water is of a temperature lower than the temperature of the gases traveling downwardly at the level at which the water is thus introduced, said economizer water heater and said water jacket comprising means for the outflow of the cooler water from said water heater at a relatively low level in said heater and through said water jacket, a circulation of the water being maintained between and through said water heater and said jacket, the heat of the water being so controlled at a suitable zone in said water heater as to secure a proper temperature for the water introduced in the jacket of said engine, and for the further heating of the water in said jacket, the water being given a higher heating in said water heater by the heat of the gases exhausted and conveyed through said hot gas exhaust conduit.

3. In a power generating system, the combination of (1) an internal combustion engine, (2) a vertically disposed counter-current boiler for highly heating water from hot gases exhausted from the internal combustion engine, (3) means for conveying the waste heat of said engine to the water of said boiler for heating water and for controlling the pressure of steam generated in said heater, (4) a steam accumulating tank connecting with said boiler for receiving and accumulating steam generated in said heater and for receiving and accumulating steam otherwise produced, (5) a steam turbine separate and apart from said internal combustion engine and actuated by the steam generated, and (6) means for unifying the motive force of said internal combustion engine and said steam turbine without loss of motive efficiency in either engine or turbine due to unfavorable rates of motion in either said engine or said turbine and for driving machinery by the motive force created by the union of the two motive forces.

4. In a power generating system, the combination with a steam motor, of (1) a gas generator, (2) means for forming steam under pressure from the sensible heat of the newly generated gas, (3) an internal combustion engine for burning the gas generated, (4) means for generating steam from the waste heat of the internal combustion engine, (5) a steam motor actuated by the steam made, and (6) means for utilizing the exhaust steam from said steam motor in gas making in said gas generator, said combination of elements securing the utilization of the explosive force of gas, the expansive force of the steam created, and the regenerative use of the latent heat of the steam after its working pressure has been utilized in work.

5. In a power generating system, the combination of (1) a gas generator, (2) means for utilizing the heat of the gas newly generated, (3) a gas engine for burning the gas, (4) means for forming steam from the waste heat of the gas engine, (5) a steam motor for using the steam thus generated, (6) means for utilizing the motive forces of said engine and said motor, (7) a combined air heater and condenser of the steam from said steam motor for heating air for combustion, cooling feed water and creating a vacuum exhaust for said steam motor, and (8) means for utilizing the water cooled in said air heater and condenser for feed water purposes in said system and for conveying the air heated to places in said system for purposes of economic combustion.

6. In a power generating system, the combination of (1) a gas generator, (2) a gas cooler and water heater for cooling the gas generated and for heating water, (3) a scrubber for cleaning the gas, said scrubber comprising means for using the scrubbing fluid circuitously and in copious amounts, (4) a gas engine for using the gas, (5) means for generating steam from the heat wastes of the gas engine, (6) a steam motor for using the steam, (7) means for heating air with the heat generated in said system that is otherwise not used in generating motive power, and (8) means for utilizing said heated air for purposes of combustion.

7. In a power generating system, the combination of (1) an internal combustion engine, (2) a steam motor, (3) means for unifying in one outflow of motive force the motive energy of said internal combustion engine and the motive power of said steam motor, (4) a vertical counter-current water heater and boiler for generating steam for said steam motor from the heat wastes of the internal combustion engine, and (5) a vertical counter-current water cooler, air heater and steam condenser for condensing the exhaust steam from the steam motor for forming a vacuum exhaust for the motor and for heating air for combustion for use in said system.

8. In a power generating system, the combination of (1) an integral combustion engine, (2) means for generating steam from the heat wastes of the internal combustion engine and further means for superheating the steam, (3) a tank for the accumulation and storage of steam in a high state of compression, and (4) means working in unison with the activity of the internal combustion engine for utilizing in work the stored highly compressed steam.

9. In a power generating system, the combination of (1) a gas generator, (2) a gas cooler and water heater for cooling the gas generated and for heating water, (3) an engine for burning the gas generated, and (4) an economizer boiler for highly heating water and creating steam from the heat wastes of the gas engine, said gas cooler and said economizer boiler being vertically disposed and constructed for the vertical counter-current travel of the heating medium and the medium to be heated and being so placed and connected as to provide for substantially the same water level in both cooler and boiler.

10. In a power generating system, the combination of (1) means for generating a combustible gas, (2) an internal combustion engine for using the generated gas, (3) an economizer water heater and boiler for generating steam from the heat wastes of the internal combustion engine, (4) a steam motor for using the steam, and (5) means for heating air for combustion and for cooling feed water for feeding the water heater and boiler, the heat wastes of the steam motor heating said air, said means for heating air for combustion, for cooling feed water and feeding the feed water in said system securing the absorption of low degrees of heat conveyed in the exhaust gases of the internal combustion engine and for securing the regenerative economization of the heat wastes of the steam motor.

11. In a power generating system, the combination of (1) a gas generator, (2) a water jacketed internal combustion engine for using the gas generated, (3) a vertical counter-current economizer boiler connected with said engine for generating steam from the heat wastes of said engine, said boiler being arranged for the introduction of cool feed water at the bottom of said boiler and for the direct vertically upward travel of said water through the boiler and for the introduction of the hot exhaust gases of said engine at the top of said boiler and for the direct vertically downward travel of said gases in said boiler and for the exit of said gases from the bottom of said boiler, said travel of gases being in counter-current to the travel of the water, said boiler having further means for conveying from a selected level in said boiler water of proper temperature for introduction into the water jacket of said engine and comprising further means for the re-introduction into said boiler of water that has passed through said water jacket, said water being reintroduced into said boiler at a level where the temperature of the gases descending through said boiler is higher than the temperature of the water reintroduced and at a level in the boiler where the water in the boiler is substantially of the same temperature as that of the water re-introduced, and (4) means for controlling the amount of water flowing from said boiler through said jacket and re-introduced in said boiler.

12. In a power generating system, the combination of (1) means for generating producer gas from soft bituminous coal, (2) means co-acting with said first named means for removing tar from said gas through contact with heated surfaces, (3) means for economizing in useful work the heat generated from the making of said gas, (4) means for securing a proper amount of moisture in said gas, (5) means for securing a by-product of ammonia from said gas, (6) a gas engine for burning said gas, (7) means for creating steam under pressure from the waste heat of said engine and for creating motive power from said steam, (8) means for uniting and applying in useful work the motive power of said internal combustion engine and the force in said steam, and (9) means for economizing the waste heat of said steam after it has become expanded in the creation of motive power.

13. In a power generating system, the combination of (1) means for generating a combustible gas, (2) a water jacketed internal combustion engine for using the gas, and (3) means for regulating the temperature of the jacket water introduced in said jacket for cooling said engine, said last named means comprising provision for securing a temperature of said feed water favorable to the efficient working of the motor parts of said engine, said combination being exemplified by an economizer water heater with a water conduit connecting said jacket and the water heater at levels where the water is of the desired temperature.

14. In a power generating system, the combination of (1) a gas generator, (2) a water jacketed internal combustion engine for using the gas, (3) a vertical counter-current water heater and boiler for economizing the waste heat of the gases of the internal combustion engine for heating water and generating steam, (4) means for utilizing some of the jacket water heat in producing steam, and (5) means for controlling the temperature of the water in the water jacket and for using continuously and in cycle the jacket water used in said jacket, said last named means providing for the cooling to a suitable temperature of the water that has passed through and become heated in the jacket.

15. In a power generating system, the combination of (1) a gas generator, (2) an internal combustion engine for burning the gas generated, (3) a vertical counter-current economizer for heating water and forming steam from the jacket water and exhaust gases of said engine, (4) means for uniting the motive power of said internal combustion engine and of the steam generated from the waste heat of said engine, (5) means separate and apart from said economizer for the reception, accumulation, storage and equalization of pressure of the steam formed in said system, and (6) a steam motor for utilizing the force of the steam thus accumulated, stored and equalized in pressure.

16. In a power generating system, the combination of (1) means for producing combustible gas, (2) an internal combustion engine for burning said gas, (3) means for generating steam from the heat wastes of said internal combustion engine, (4) a low pressure turbine for utilizing the steam generated, (5) means for unifying in one outflow of motive power the power generated by said internal combustion engine and said low pressure turbine, and (6) means comprising a condenser for creating a vacuum exhaust for said turbine and further means for economizing in heating air for combustion the heat transferred in said last named means.

17. In a power generating system, the combination of (1) a producer gas generator, (2) a water jacketed internal combustion engine for using the gas generated, (3) means for controlling the heat of the water used to feed said water jacket, (4) means for controlling the temperature of said water for feeding said jacket by controlling the rate of circulation of the feed water while passing through the jacket, (5) means for increasing the temperature of and forming steam from the water that has been partially heated in said system from waste heat generated in said system, and (6) means for utilizing the steam thus created.

18. In a power generating system, the combination of (1) a gas generator, (2) a gas engine for using the gas, (3) means for generating steam separate and apart from said gas engine, (4) means for accumulating and storing the generated steam under pressure, (5) means for using said accumulated and stored steam for initiating motion in said gas engine and for controlling the rates of motion in said engine and for securing smoothness of motion in said engine.

19. In a power generating system, the combination of (1) a gas generator, (2) an internal combustion engine for using the gas, (3) means for generating steam from the heat wastes of the internal combustion engine, (4) a low pressure turbine for utilizing the steam generated, (5) a condenser connected with said turbine for accelerating the motive force generated by said turbine.

20. In a power generating plant, the combination of (1) a gas producer, (2) means for cleaning the gas, (3) means for heating water and generating steam from the heat of the gas making, (4) an internal combustion engine for burning the gas, (5) means for generating steam by utilizing the heat wastes of the internal combustion engine, (6) a steam motor for generating motive power from the steam, (7) means for unifying the motive power of the internal combustion engine and of the steam motor, and (8) means for utilizing the waste exhaust heat in the steam for warming air for combustion, said gas producer comprising means for securing a travel of gases horizontally under the impervious fuel in said gas producer and upwardly through more or less coked pervious parts of the fuel and for the passage of the gases over heated surfaces whereby is secured the fixation of some tarry vapors in said gases into combustible gas.

21. In a power generating plant, the combination of (1) a gas producer, (2) a gas cooler and tar condenser, (3) a wet scrubber for removing dust from the gas, said scrubber having means for the continuous cyclic flow of the same scrubbing water through said scrubber, whereby said gas can be more thoroughly washed with large volumes of water without the wasteful use of large quantities of water and whereby an ammoniacal fluid of commercial value is secured, (4) an internal combustion engine for using the gas, (5) means for generating steam from the heat wastes of gas making and of the internal combustion engine, (6) means for generating motive power from the steam, (7) means for accumulating, concentrating and storing energy from the heating of water with the heat wastes of the heat of gas making and of burning the gas in the internal combustion engine, (8) means for applying in work at will the energy thus accumulated, and (9) means for applying in useful work the heat of steam that has been applied expansively in work in said plant.

22. In a power generating system, the combination of (1) a gas generator, (2) a gas engine for using the gas, (3) means for generating power from the heat wastes of the gas engine, (4) other means for generating power, (5) means for accumulating and storing the power dually generated, and (6) means for using the accumulated and stored power for controlling motion in the gas engine.

JOSEPH MOSES WARD KITCHEN.

Witnesses:
ELIZABETH B. KING,
GEO. L. WHEELOCK.